April 26, 1955

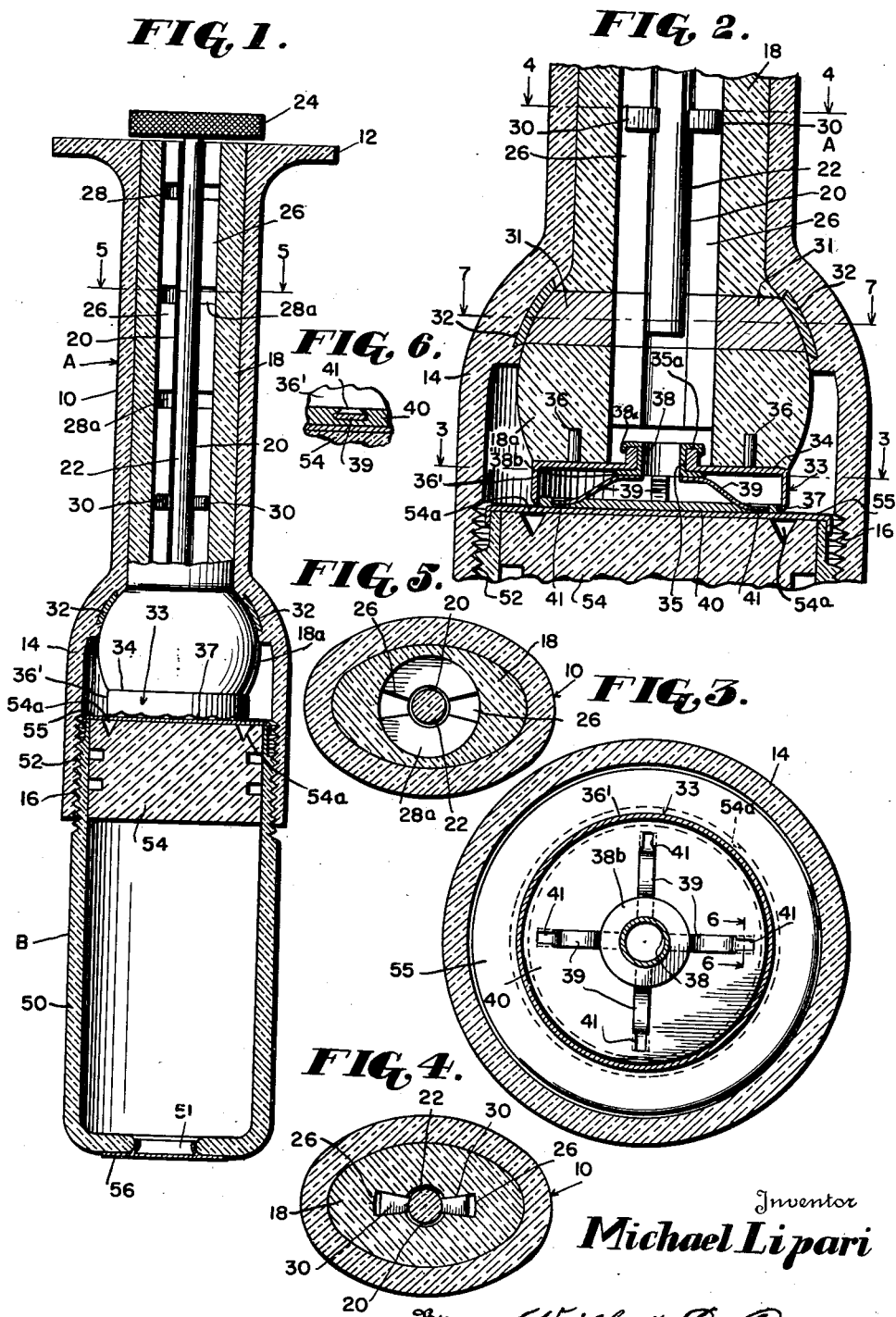

M. LIPARI 2,706,984

PLUNGER ASSEMBLY AND DISPOSABLE MEDICAMENT
CARTRIDGE FOR USE THEREWITH

Filed March 19, 1953

Inventor
Michael Lipari
By Wilfred E. Lawson
Attorney

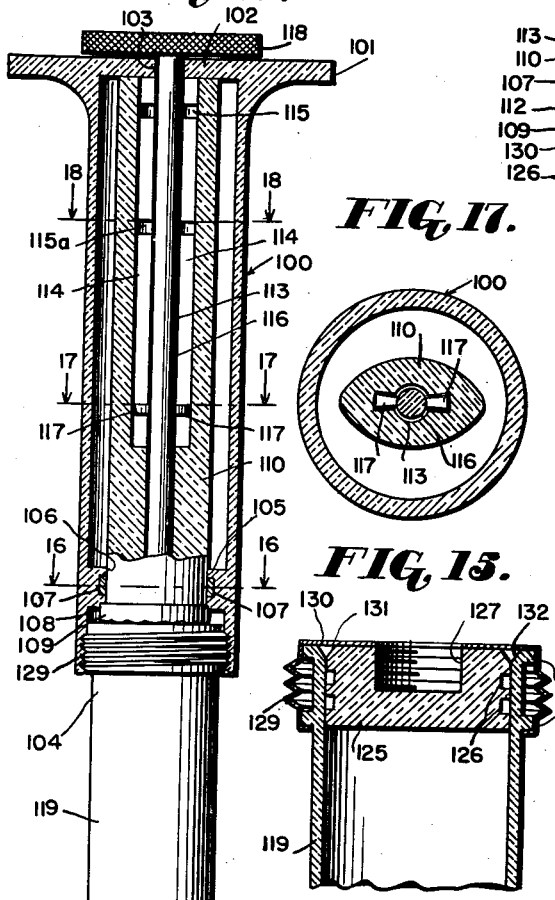

April 26, 1955  M. LIPARI  2,706,984
PLUNGER ASSEMBLY AND DISPOSABLE MEDICAMENT
CARTRIDGE FOR USE THEREWITH
Filed March 19, 1953  7 Sheets-Sheet 4

Inventor
Michael Lipari
By Wilfred E. Lawson
Attorney

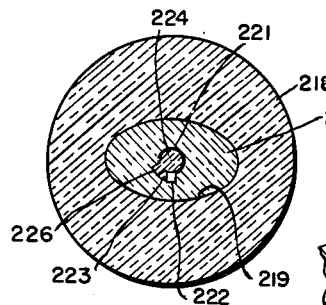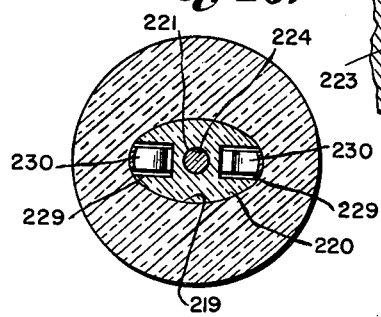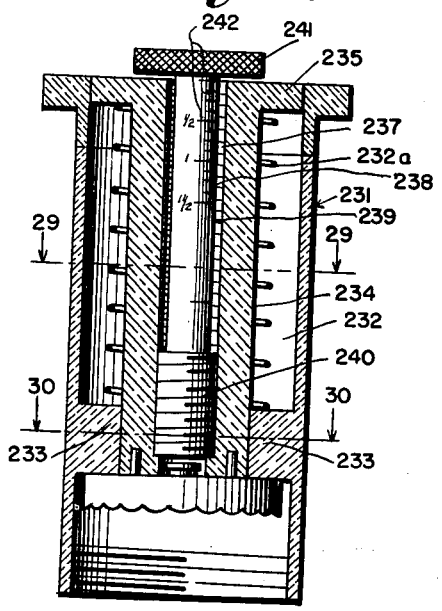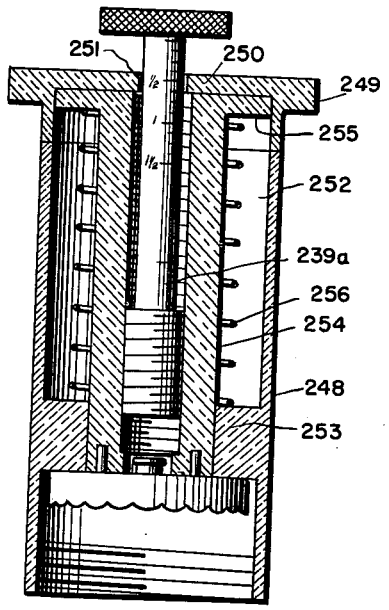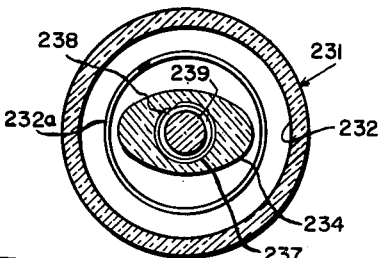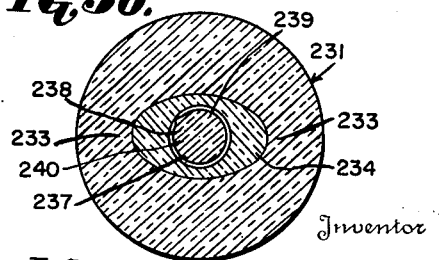

April 26, 1955
M. LIPARI
2,706,984
PLUNGER ASSEMBLY AND DISPOSABLE MEDICAMENT
CARTRIDGE FOR USE THEREWITH
Filed March 19, 1953
7 Sheets-Sheet 6
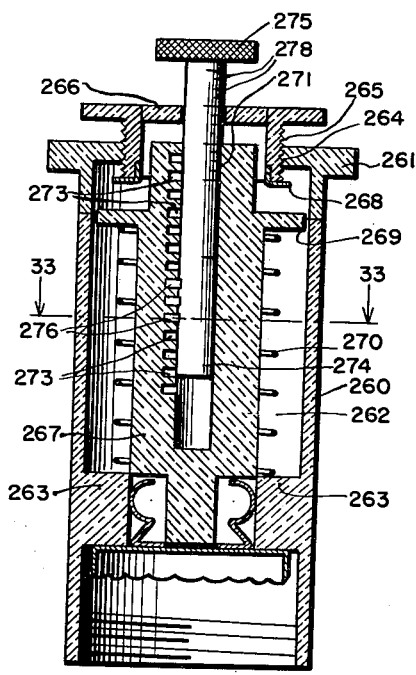
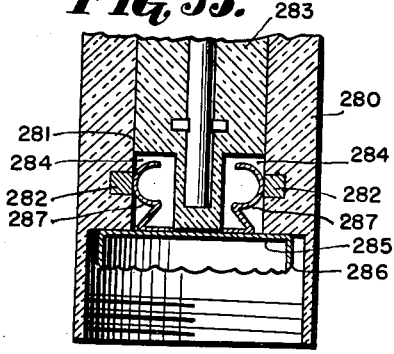
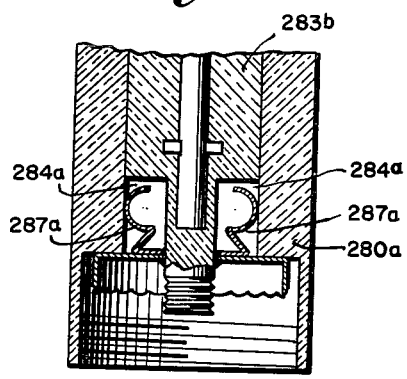
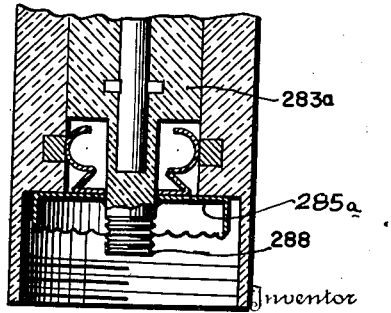
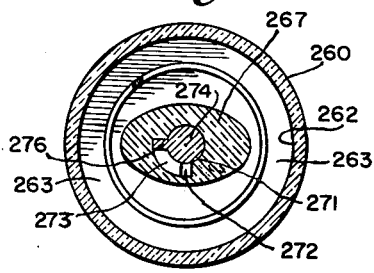
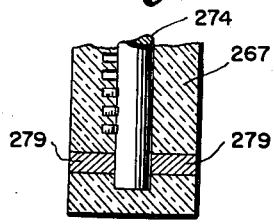
Inventor
Michael Lipari
By Wilfred E. Lawson
Attorney April 26, 1955
M. LIPARI
2,706,984
PLUNGER ASSEMBLY AND DISPOSABLE MEDICAMENT CARTRIDGE FOR USE THEREWITH
Filed March 19, 1953
7 Sheets-Sheet 7
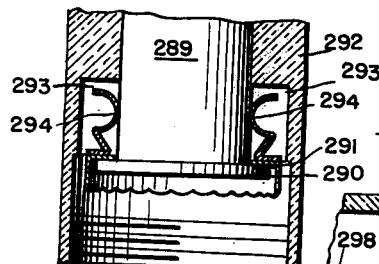
FIG. 38.
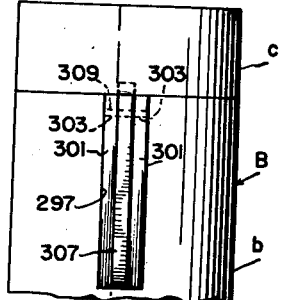
FIG. 42. FIG. 46.
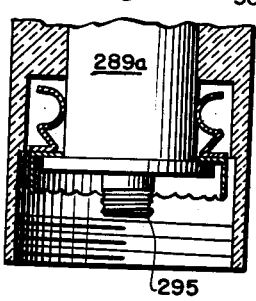
FIG. 39.
FIG. 43.
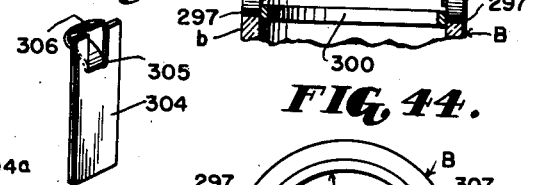
FIG. 47.
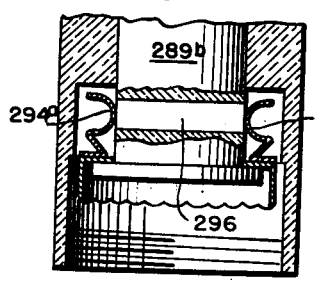
FIG. 40.
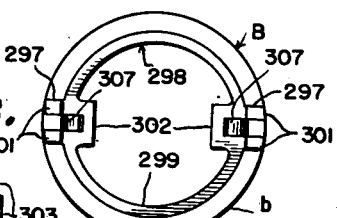
FIG. 44.
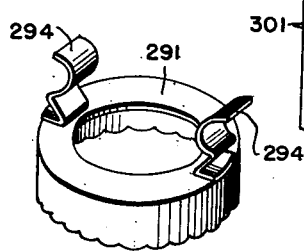
FIG. 41.
FIG. 48.
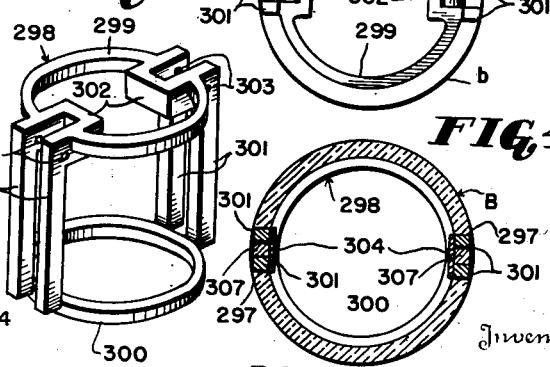
FIG. 45.
Inventor
Michael Lipari
By Wilfred E. Lawson
Attorney

United States Patent Office 2,706,984
Patented Apr. 26, 1955

2,706,984
PLUNGER ASSEMBLY AND DISPOSABLE MEDICAMENT CARTRIDGE FOR USE THEREWITH

Michael Lipari, Oneonta, N. Y., assignor to Gioacchino Lipari, East Meadow, N. Y.

Application March 19, 1953, Serial No. 343,324

9 Claims. (Cl. 128—218)

This invention relates generally to the class of surgery and is directed particularly to improvements in combination devices for injecting a medicinal substance into external orifices of the body, or directly into the tissues of the body from a disposable container by means of an improved plunger assembly.

A principal object of the present invention is to provide an improved plunger assembly and disposable medicament cartridge for use in association therewith, wherein a sealing element forming a part of the cartridge structure is automatically cut or ruptured by means carried by the plunger assembly when the plunger element of such assembly and the sealing element are forced together in the act of coupling the cartridge with the assembly.

Another object of the invention is to provide in a combination structure of the character above set forth, a novel plunger assembly wherein means is provided for facilitating the extension of the plunger from the plunger barrel to any selected one of a number of predetermined distances to thereby accurately gauge the quantity of medicament ejected from the attached cartridge.

A still further object of the invention is to provide in a combination structure of the above described character, a novel plunger assembly comprising a barrel, a plunger body in the barrel and a plunger actuating stem telescopically received in a passage formed longitudinally through the plunger with means whereby such stem may be withdrawn to any selected one of a number of different positions and then coupled with the plunger to effect the projection of the plunger into a cartridge attached to the barrel.

Still another object of the invention is to provide in a combination device of the character stated, a novel medicament cartridge and plunger assembly wherein the end of the cartridge which is detachably connected with the plunger assembly barrel is closed by a movable plug and seal cap, with coacting means between the plunger body of the plunger assembly and the cartridge closing plug whereby the seal cap will be cut when the plunger element of such assembly and the sealing element are forced together in the act of coupling the cartridge with the assembly.

Still another object of the invention is to provide an improved combined cartridge and needle structure with a detachable means for maintaining the needle sterile and for insuring a clean or clear needle bore.

A still further object of the invention is to provide an improved combined cartridge and needle structure with a removable needle shield and swab carrier whereby the maintenance of the needle in a sterile condition is assured and the user is provided with a readily accessible swab soaked with disinfecting solution ready for instant use.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawings:

Figure 1 is a view in longitudinal section showing one embodiment of the plunger assembly with a disposable cartridge attached thereto ready for use.

Figure 2 is a longitudinal section on an enlarged scale through the central portion of the structure shown in Figure 1, showing details of the cutter and other parts not detailed in the first figure.

Figure 3 is a transverse section taken substantially on the line 3—3 of Figure 2.

Figure 4 is a transverse section taken substantially on the line 4—4 of Figure 2.

Figure 5 is a transverse section taken substantially on the line 5—5 of Figure 1, on an enlarged scale.

Figure 6 is a sectional view taken substantially on the line 6—6 of Figure 3.

Figure 13 is a view partly in longitudinal section and partly in elevation of a second embodiment of the plunger assembly showing the same attached to a disposable hypodermic cartridge.

Figure 14 is a longitudinal section on an enlarged scale of the lower portion of the structure shown in Figure 13.

Figure 15 is a longitudinal sectional view of the upper end of the disposable hypodermic cartridge shown in Figures 13 and 14, illustrating more clearly the closure and sealing means.

Figure 16 is a sectional view taken substantially on the line 16—16 of Figure 13.

Figure 17 is a sectional view taken substantially on the line 17—17 of Figure 13.

Figure 25 is a transverse section on the line 25—25 of Figure 24.

Figure 26 is a transverse section on the line 26—26 of Figure 24.

Figure 27 is a detail section on an enlarged scale of the plunger shown in Figure 25 and illustrating the slot and recess for the stem and lug.

Figure 28 illustrates in longitudinal section another form of barrel and plunger and stem adjusting means.

Figure 29 is a transverse section on the line 29—29 of Figure 28.

Figure 30 is a transverse section on the line 30—30 of Figure 28.

Figure 31 is a longitudinal section through another embodiment of the barrel and plunger shown in Figure 28.

Figure 32 is a longitudinal section through still another form of barrel and plunger showing a micrometer adjustment means.

Figure 33 is a transverse section on the line 33—33 of Figure 32.

Figure 34 is a detail section illustrating the employment of magnets for holding in position a stem of the plunger of the character shown in Figure 32.

Figure 35 is a view illustrating another embodiment of the means employed for holding the plunger in position in the barrel by means of magnets, in association with a disk type of cutter.

Figure 36 is a detail view illustrating another form of cutter and magnet holding means in combination.

Figure 37 illustrates a cutter structure of the character shown in Figure 36 with friction means for holding the plunger in position in the barrel.

Figure 38 is a detailed view illustrating another form of plunger and cutter wherein the cutter is attached to the barrel.

Figure 39 is an illustration in detail of a plunger and cutter construction corresponding to Figure 38 but wherein the plunger has a threaded stem.

Figure 40 is a detail view illustrating another means of holding the plunger in position by means of a magnet.

Figure 41 is a view in perspective of a cutter structure of the character illustrated in Figures 38 to 40 inclusive.

Figure 42 is a view in side elevation of the upper part of a barrel only illustrating a retractile finger grip assembly on one side of the barrel, wherein the grip bar is in closed position.

Figure 43 is a longitudinal section taken substantially on the line 43—43 of Figure 42, showing the two grip bars in closed position.

Figure 44 is a transverse section taken on the line 44—44 of Figure 43.

Figure 45 is a transverse section taken substantially on the line 45—45 of Figure 43.

Figure 46 is a detail sectional view illustrating the finger grip bar in opened or extended position ready for use.

Figure 47 is a detailed view of the plate and spring which holds one of the finger grip bars in closed or extended position.

Figure 48 is a view in perspective of the spring plate and finger grip bar supporting frame which positions within the barrel.

Figure 12:
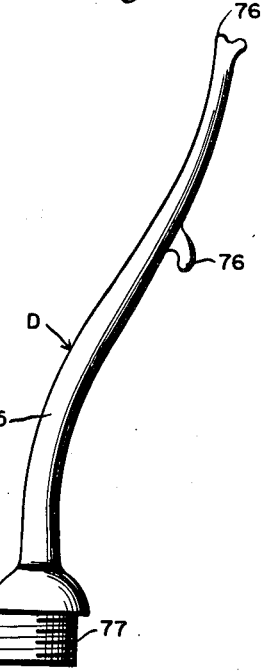
Figure 12 is a view in elevation of a cervical diaphragm applicator designed for attachment to the plunger assembly, the parts being on a smaller scale than the plunger assembly parts shown in Figure 1.
Figure 8:
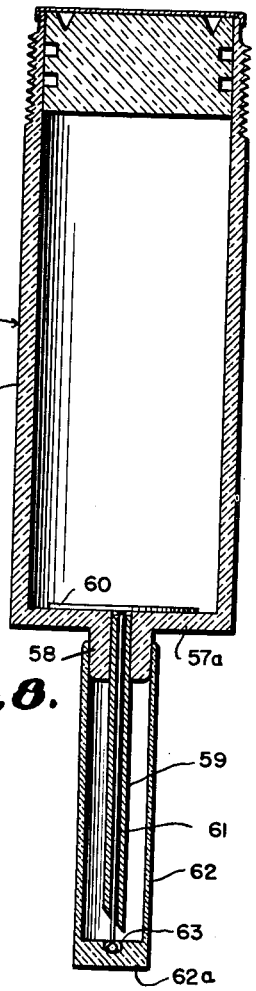
Figure 8 is a view in longitudinal section of a second form of disposable cartridge designed for hypodermic use.
Figure 9:
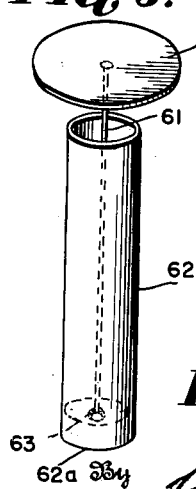
Figure 9 is a view in perspective of the needle shield, stylet and attaching disk forming a part of the cartridge of Figure 8.

Referring now more particularly to the drawings the reference character A generally designates the plunger assembly to which may be detachably connected one of several different units such as; the disposable medicament cartridge which is generally designated B and which is designed for the introduction of medicines or other agents into external orifices of the body; the disposable medicament cartridge which is generally designated C and which is designed, by having a hypodermic needle integral therewith, for giving hypodermic injections, or a diaphragm applicator such as that illustrated in Figure 12 and generally designated D.

The plunger assembly A comprises an elongate barrel 10 which is open at both ends as illustrated. This barrel is formed at the top or outer end with an encircling flange 12 providing a finger rest when the outer end of the barrel is held between the index finger and the second finger of the hand.

The forward or inner end of the barrel is of enlarged diameter as shown forming a coupling collar or bell 14, which is provided with the internal screw threads 16 for facilitating the attachment of the other units previously referred to. The bell 14 forms, of course, an integral part of the barrel and in reference hereinafter to the barrel as being open at its inner and outer ends it is to be understood that this includes the bell portion referred to.

The portion of the barrel from the flanged outer end up to the bell 14 is of oval cross sectional form as illustrated in Figure 4 and fitting snugly within the barrel for sliding movement, is a plunger 18 which includes at its inner end the enlarged or bulbous head 18a which lies within the bell portion 14 when the plunger has been shifted to the limit of its movement outwardly in the barrel. When in this latter position the outer end of the plunger is substantially flush with the outer end of the barrel as shown and the inner end of the plunger extends approximately half way through the length of the bell 14, terminating short of the inner end portion of the threaded part 16.

Formed longitudinally and axially through the plunger 18 is a bore 20 in which is slidably positioned a metallic stem 22.

The outer end of the stem carries a thumb rest 24 which is of a diameter slightly greater than the maximum bore diameter of the barrel so that it cannot enter the barrel when the plunger is forced inwardly.

The plunger body is also provided with the two longitudinal slots 26 which are at opposite sides of the bore 20 and parallel with and open into the bore. These slots terminate at their outer ends short of the outer end of the plunger and open into the circular slot 28.

Between this circular slot 28 and the inner end of the bore 20, other circular slots 28a are formed, for the purpose hereinafter set forth.

Adjacent to its inner end, the stem 22 carries a cross arm or cross bar 30, constituted in a pair of oppositely disposed radial lugs, the ends of which slidably engage in the adjacent longitudinal grooves or slots 26. By the provision of this cross bar or cross arm 30, it will be seen that the stem can be drawn outwardly with respect to the plunger to a selected position where the cross bar can be engaged, by partial rotation of the stem, in one of the circular slots 28, whereupon the plunger can be moved inwardly in the barrel to project the forward end 18a through the open end of the barrel. The extent of this projection of the plunger from the barrel is limited or controlled by the selective engagement of the cross bar or lugs 30, in one or the other of the circular slots 28—28a, as will be readily apparent.

In order to maintain the plunger in its fully withdrawn position into the barrel when the barrel is not attached to one of the units with which it is designed for connection, there is provided in the forward end of the plunger a bar magnet 31 which extends transversely of the plunger and is exposed at its opposite ends as shown and at opposite sides of the bell portion 14 there are secured the metal plaques 32, each of which is in close proximity to an end of the bar magnet when the plunger is fully retracted so that the attraction of the magnet for the metal plaques will hold the plunger in retracted position.

By the formation of the plunger of a cross sectional contour other than circular, it will be seen that the plunger cannot turn from proper position and thereby destroy the functioning of the magnet.

When the stem 22 is fully telescoped into the plunger body it will be noted that the innermost end of the stem is inserted into a bore through the center of the bar magnet 31 and is in close proximity to it so that the attraction of the magnet for that portion of the metallic stem will hold the stem in its fully inwardly telescoped position.

The inner end of the enlarged portion 18a of the plunger presents a relatively large face or surface to which is attached a guarded knife unit which is generally designated 33 and the purpose of which will be hereinafter set forth.

The knife unit 33 comprises a circular plate or disk 34 having a central opening 35 therethrough and is provided with the upwardly extending pins 36 which are secured in a suitable manner in receiving openings formed in the end face of the plunger.

The opening 35 is defined by a collar 35a which extends upwardly from the disk 34 for the purpose about to be described.

Formed around the edge of the disk 34 and extending downwardly or in the opposite direction from the collar 35a is a circular knife 36' having a serrated cutting edge 37.

Extending through the opening 35, and the collar 35a is a sleeve 38 having top and bottom flanges 38a and 38b respectively which respectively engage over the outer end of the collar 35a and against the inner face of the disk 34 as shown. This sleeve is rotatable within the collar 35a and the inner flange 38b carries a plurality of resilient and flexible strips 39, each of which is secured at an end to the flange 38b and is longitudinally curved to extend downwardly and outwardly toward the inner side of the knife edge as shown.

The resilient strips or springs 39 support within the area defined by the circular knife, a protective plate 40, by the slidable engagement of their outer ends within rimmed channels 41 formed in and radially of the top of the plate 40.

The normal position of the protective plate 40, within the circular knife, is in the plane of the cutting edge 37 as shown, so that if the plunger should be extended outwardly from the barrel to uncover the knife, the plate 40 will function to protect the person handling the plunger assembly from injury. However, when the knife is to be brought into use as hereinafter described, the plate 40 can be readily moved inwardly against the resistance of the spring strips, the free outer ends of the strips sliding in the flanged channels 41 to permit such movement of the plate as will be readily apparent.

The disposable cartridge B which is designed for connection with the end portion 14 of the barrel comprises a cylindrical receptacle 50 having the restricted outlet or discharge opening 51 at one end, while the opposite end of the receptacle is open to its full inside diameter. This latter end is provided with suitable external screw threads 52 for threaded engagement in the area 16 of the end portion 14 of the plunger barrel.

A closure or plug 54, constituting a piston, is snugly but slidably fitted in the end of the cartridge receptacle for protection of the contents.

The outer end of the closure or plug 54 is flush with the adjacent end of the receptacle 50 and a sealing cap 55 of suitable thin material is secured over the plug and sealed thereto and to the rim of the cartridge receptacle as illustrated. This sealing cap may be of tin foil or any other suitable material.

It will be understood, of course, that the maximum or overall diameter of the enlarged portion 18a of the plunger is only slightly less than the inside diameter of the receptacle 50 into which it is extended when the plunger is forced outwardly from the barrel. In such action it will be readily apparent that the forward end of the plunger engages the plug or stopper 54 and through the receptacle to eject the contents thereof through the opening 51.

The opening 51 is closed in any suitable manner as, for example, by the application across the end of the receptacle of a sheet 56 of tin foil or other suitable material, sealed to the receptacle so that it can be readily removed.

The circular knife 36' is designed to cut the sealing cap 55 when the cartridge is threaded into position in the forward end of the barrel and to facilitate this cutting of the sealing cap the outer end of the closure or plug 54 is provided with the circular channel 54a into which the cutting edge of the circular knife 36' enters so that the described rupturing of the seal is readily effected as will be apparent.

The disposable unit C is designed for giving of hypodermic injections and comprises the cylindrical receptacle 57 which at the top end, which is the end attached to the barrel, is constructed in the same manner as the cartridge receptacle 50 previously described. Accordingly, it is not believed that the detailed description of the attaching end of this cartridge is required.

The outer end of the cartridge receptacle 57 has the end wall 57a from the center of which extends the tubular nipple 58 which, of course, communicates with the interior of the receptacle as shown.

Fused into the bore of the nipple 58 is one end of a needle 59 and overlying the inner surface of the wall 57a and fused thereto is a foil disk 60 to which is attached an end of a stylet 61 which passes through the passage of the needle 59 and extends beyond the outer end of the needle as illustrated.

Enclosing the needle is a tubular shield 62 which has tightly secured in its inner end, the nipple 58 as shown, while the outer end of the shield is closed as indicated at 62a and has the outer end of the stylet secured thereto as indicated at 63.

When the needle shield 62 is removed from the receptacle or nipple 58, the end of the stylet attached to the foil cover 60 will tear a hole in the center of the foil as soon as the stylet is drawn outwardly. The stylet is withdrawn completely out of the needle as the shield is drawn away from the cartridge.

Figure 7:
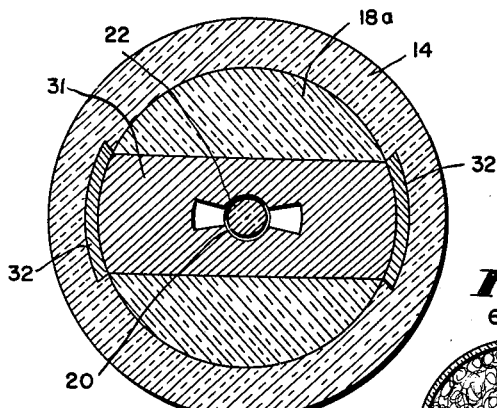
Figure 7 is a sectional view taken substantially on the line 7—7 of Figure 2.
Figure 10:
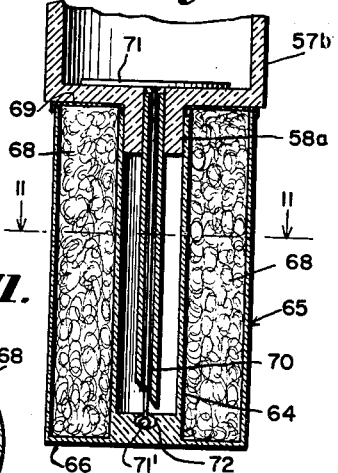
Figure 10 is a view in longitudinal section of another embodiment of the needle shield having a chambered swab receptacle associated therewith, the shield being shown applied to the disposable cartridge.
Figure 11:
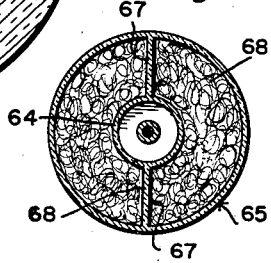
Figure 11 is a sectional view taken substantially on the line 11—11 of Figure 10.
Figure 18:
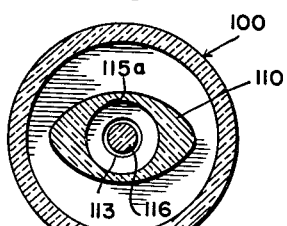
Figure 18 is a sectional view taken substantially on the line 18—18 of Figure 13.

In Figures 10 and 11 there is illustrated another form of the needle shield which has combined with it receptacles or compartments for swabs.

In the modified needle shield construction there is provided an inner tubular receptacle 64 and an outer tubular or cylindrical receptacle 65 and these two receptacles have a common bottom wall 66. As shown, the open end of the inner receptacle 64 which encases the needle, is secured on the nipple portion 58a of the cartridge receptacle 57b, a portion only of which is illustrated, and the top of the outer or swab receptacle positions against the bottom wall or end wall of the cartridge receptacle 57a. This outer receptacle is radially divided by the two partitions 67 to form the two swab compartments which are indicated by numeral 68.

The open end of the outer, or swab, receptacle is sealed by a suitable readily removable diaphragm 69 which may be applied in two sections each covering one of the swab compartments 68 so that one compartment may be opened for the withdrawal and use of the swab therein without exposing the contents of the other compartment to contamination.

The stylet 70 which is secured to the foil disk 71, which lies upon and is fused to the bottom of the cartridge receptacle 57a, has its outer end provided with a bleb or button 71' which is confined within a pocket 72 formed in the wall 66 at the bottom of the receptacle 64. This coupling between the bottom of the receptacle and the bleb or button 71' is loose so that while the end of the stylet cannot escape, the receptacle can be turned without twisting the stylet.

It will be seen from the foregoing that by providing the storage chambers or compartments 68, the person about to make an injection of the medicament is provided with absorbent material which may be already moistened or wet with an appropriate disinfecting solution which he may use to swab the site of the injection. He may unseal one chamber to use the absorbent material in it to swab the site to be pierced for injection and following the withdrawal of the needle he may unseal the second chamber to use the absorbent material in it to stop any bleeding or provide manual pressure over the puncture wound. By providing the two separately sealed chambers, sterile protection is afforded to the second swab while the operator is using the first one and is occupied with making the injection. The swab chambers accordingly provide the obvious advantage of having prepared disinfecting swab material at hand wherever the medicament in the cartridge is to be injected and they eliminate the nuisance of carrying an extra bottle of disinfectant and an extra container of dry absorbent material which have to be separately opened for use to make the necessary swabs used in accepted injection technique.

In the plunger assembly unit the provision of a number of the circular slots 28—28a to receive the cross bar on the inner end of the stem 22, provides for the setting of the stem at different levels, each of which will deliver a volume of medicament equivalent to the volume within the cartridge which is used for the level of the telescoping stem setting. Thus a standard size plunger assembly may be used to make a standard diameter cartridge. The only variation in the cartridge will be in the factor of length in order to provide for different volumes of medicament to be used.

In addition to the employment of the plunger assembly for holding the disposable cartridge units and effecting the ejection therefrom of the medicament which they carry, the assembly A may also be employed to facilitate the handling of a device of the character illustrated in Figure 12 and generally designated D which comprises an applicator for a cervical diaphragm. Such applicator comprises an elongate stem 75, one end of which is provided with the conventional hook members 76, between which the diaphragm is held for application, while the opposite end of the stem has an externally screw threaded head 77 which is designed to be threaded into the enlarged internally threaded portion 14 of the plunger assembly barrel 10.

In Figures 13 to 15 there are illustrated further embodiments of the invention relating to the cutting knife construction carried by the plunger assembly and to the manner of coupling the stopper of the cartridge with the plunger.

The reference character 100 generally designates the elongate barrel of the plunger assembly which at its top end or outer end carries the encircling finger flange 101 and this outer end has thereover the head 102 which is provided with the central opening 103 for the extension into the barrel of the hereinafter described plunger stem.

The opposite end of the barrel 100 is open and has screw threads formed in the inner surface through a portion of the length thereof and inwardly from this open end is formed a transversely disposed wall 105 through which is formed an elliptical opening 106.

In the wall of the elliptical opening 106 there are embedded, preferably at the ends of the ellipse, the metal plaques 107 corresponding to the plaques 32 of the first described assembly.

The wall 105 provides a downwardly or outwardly facing shoulder 108 in which is fixed the forward or outwardly directed circular knife 109 having a serrated cutting edge.

Lying within the barrel 100 is the plunger body 110 which is of elliptical cross sectional form and of a dimension to fit in the elliptical guide opening 106 through which the plunger is moved in the use of the device.

As illustrated the plunger 110 is of such length that when the outer end is against the top 102 of the barrel the inner or forward end will extend through and slightly beyond the elliptical opening 106 and this forward circular end is provided with the centrally positioned threaded stud 111 for attachment to the hereinafter described cartridge stopper.

Embedded in the forward end of the plunger are two bar magnets 112 which are aligned on the long axis of the elipse defined by the cross section of the plunger and are located so that when the plunger is fully retracted in the barrel the outer ends of the magnet bars will be positioned adjacent to the metal plaques.

The plunger 110 has the axial passage 113 therein which open through its outer end in line with the opening 103 and this passage communicates at opposite sides with the slots 114 formed longitudinally in the plunger.

The outer ends of the slots terminate at and open into a circular or annular slot 115 and other circular slots are provided at 115a as shown for the purpose previously set forth in connection with the plunger assembly first described.

Slidably disposed in the passage 113 of the plunger is the plunger stem 116 which carries adjacent to its inner end the cross arms 117 which slidably engage in the slots 114 and which are adapted to be positioned in a selected one of the circular slots 115 or 115a.

When the stem 116 is fully telescoped into the plunger body it will be noted that the innermost end of the stem comes into close proximity to the bar magnets 112 so that the attraction of the magnets for that portion of the metal stem will hold the stem in its fully inwardly telescoped position.

The outer end of the stem 116 carries the thumb rest 118 which positions against the outer side of the head 102 when the stem is extended to the limit of its movement into the barrel.

In Figure 14 there is illustrated the cartridge designed for use with the plunger assembly shown in the preceding figure. In this cartridge construction the numeral 119 designates the cylindrical receptacle in which the medicament is contained and this receptacle at its forward end is closed by the wall 120 which has the central outlet opening 121.

Encircling the opening 121 and extending forwardly from the outside of the wall 120 is the tubular teat or coupling sleeve 122 which is of an inside diameter slightly greater than the diameter of the opening 121.

Sealed in the teat 122 is a stopper 123 of a material which can be readily penetrated by a hypodermic needle and the outer end of the stopper has a conical socket 124 therein.

The opposite end of the cartridge receptacle 119 is closed by a stopper or closure plug 125 which fits snugly within the mouth of the receptacle and which has the ribbed side wall 126 as shown, whereby such plug can be converted to a piston when engaged with the plunger 110.

The outer end of the plug 125 has an internally threaded socket 127 which is adapted to threadably receive the threaded stud 111 at the inner end of the plunger 110.

The end of the cartridge receptacle 119 which carries the plug 125 has encircling flanges on the outer wall as indicated at 128 and engaging over the plug 125 around the socket 127 and extending to the outside of the cartridge and across and secured to the flanges or ribs 128 is a sealing cap 129, of tin foil or other suitable material, which is secured to the plug and to the receptacle whereby to form an airtight joint but which is readily removable.

The inner corner of the receptacle at the end thereof adjacent to the plug 125 is slightly beveled as indicated at 130 and the adjacent corner of the plug 125 has a corresponding bevel 131 so that there is formed beneath the sealing foil an annular V-slot 132 which receives the cutting end of the circular knife 109 when the cartridge is coupled to the plunger assembly.

The structural design of the plug 125 and the sealing cap 129 is such that the plug and cap as a unit may be assembled to the empty cartridge at the assembly plant. The cartridge thus plugged and capped may be internally sterilized at the assembly plant by piercing the plug through its dead center to apply live steam and suction. The cartridge with needle and needle shield attached, entirely pre-sterilized, may then be sent to pharmaceutical plants for direct filling by simply piercing (under sterile conditions) the dead center of the plug.

The teat or sleeve 122 at the forward end of the cartridge is designed to snugly receive the open end of an elongate tubular needle shield 133, the outer end of which shield is closed as at 134. This shield houses and maintains in sterile condition the double pointed needle 135, the inner end of which is embedded in the stopper 123 but does not extend through the same.

Adjacent to this inner end which is embedded in the stopper 123, the needle carries a conical collar 136, the tapered portion of which is directed toward the socket 124.

The needle, upon the forward side of the collar 136 passes through a centrally apertured shoulder 137 against which the needle collar rests.

The inner end of the needle shield when attached to the teat or sleeve 122, is spaced from the end wall 120 of the cartridge and the intervening space is tightly sealed against the entrance of air and moisture by a paraffin seal 138 or other suitable sealing material which can be readily broken away.

In the use of the unit descirbed in the last named figures, the physician or other person desiring to use the syringe first twists the needle shield so as to break away the paraffin seal 138, whereupon the shield is forced inwardly to impose pressure against the needle collar 136 by the shoulder 137. In this manner the inner end of the needle is forced completely through the sealing plug 123 and the shield can then be withdrawn, leaving the needle exposed and ready for use.

Figure 19:
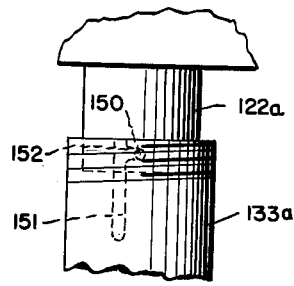
Figure 19 is a detail view illustrating another form of connection between the shield and the cartridge teat.
Figure 23:
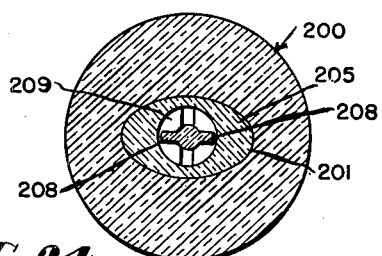
Figure 23 is a transverse section taken substantially on the line 23—23 of Figure 20.
Figure 21:
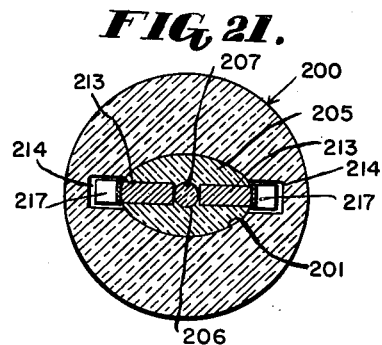
Figure 21 is a sectional view taken substantially on the line 21—21 of Figure 20.
Figure 22:
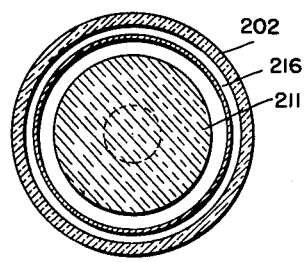
Figure 22 is a transverse section taken substantially on the line 22—22 of Figure 20.

In Figure 19 a slightly modified form of the connection between the shield and the cartridge teat is illustrated, wherein the teat or sleeve 122a is provided with a short laterally directed pin 150 upon its outer side and the inside wall of the needle shield 133a is provided with a longitudinally directed groove 151 having a lateral extension 152 as shown. It will be readily apparent that with this arrangement when the needle shield is placed in shielding position the pin 150 will be run into the groove 151 until it reaches the lateral portion 152, whereupon the shield can be turned slightly to engage the pin in the lateral part of the groove, thus holding the shield in position until the unit is ready for use. The user may then reversely turn the shield to bring the pin back into the groove 151, whereupon the shield can be shifted lengthwise on the teat as in the case of the shield 133 to effect the penetration of the stopper by the cartridge end of the needle.

It will also be apparent from the foregoing that needles of different gauges and lengths may be used in the present invention without having to modify any of the features of the invention as the needle collar and the portion of the needle lying between the collar and the stopper can be of the same size for all types of needles.

Prior to the uncovering of the needle the opposite end of the cartridge is introduced into the threaded open end of the barrel and rotated so as to effect the threaded coupling of the portion of the sealing foil 129 encircling the side of the cartridge, with the threads 104. This encircling portion of the sealing foil can be formed with suitable threads as illustrated, for engagement with the threads 104. At the same time the threaded socket 127 receives the threaded stud 111 on the end of the plunger and as the cartridge moves inwardly the portion of the sealing foil overlying the socket 132 will be brought into forceable contact with the circular knife 109 and cut so that the closure plug or stopper 125, being then coupled with the plunger 110, can be forced in the receptacle 119.

To facilitate the movement of the plug or stopper 125 the plunger stem 116 is first drawn outwardly and the cross arms 117 engaged either in the slot 115 or one of the slots 115a. Thus the stem and plunger become locked together with the plunger drawn out and when pressure is then applied to the thumb rest 118 the plunger will be moved inwardly with the plug 125, with now functions as a piston, will force the contents of the receptacle 119 outwardly through the needle 135.

If desired, the needle may be provided with a stylet 139. The outer end of the stylet may be fused in the end wall or bottom 134 of the needle shield as illustrated. With this construction it will be seen that the stylet will be withdrawn from the needle when the shield is removed, as in the other forms of the invention previously described.

In Figures 20 to 23 there is illustrated another embodiment of the circular knife structure and the manner in which it is disposed in relation to the inner end of the assembly.

In these figures the numeral 200 generally designates the barrel in which is formed the passage or bore 201 which is of elliptical cross section. The lower end of the barrel is formed to provide the coupling collar 202 which is internally screw threaded as at 203 for connection with the threaded end of the disposable cartridge such as that illustrated in Figure 1.

At the outer end of the barrel 200 is formed the finger flange 204 which, however, may be replaced by the hereinafter described finger grip assembly, that is, the barrel instead of being formed with this flange 204 may have the hereinafter described finger grip assembly applied thereto.

The numeral 205 designates the plunger through which is formed the passage 206 in which is mounted for reciprocation the stem 207 which, as in the construction shown in Figures 1 and 13, may be provided at its inner end with the cross bar 208 for selective engagement in a circular slot 209 around and opening into the passage 206.

The outer end of the stem 207 carries the thumb rest 210.

Figure 20:
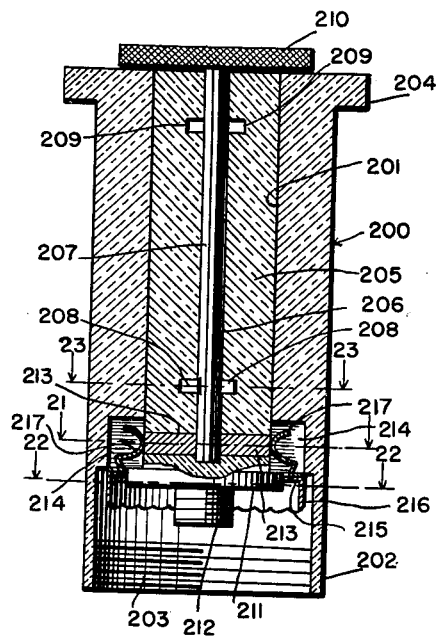
Figure 20 illustrates another embodiment of the circular knife structure shown in association with a barrel and plunger which are in longitudinal section.

In the structure illustrated in Figure 20, the inner end of the plunger 205 has the surrounding flange 211 which limits the outward movement of the plunger and this end of the plunger also has formed integrally therewith the threaded stud 212 for connection in the threaded socket of a closure plug carried by the disposable cartridge, such as the plug illustrated in Figure 15.

The inner end of the plunger 205 has the two spaced bar magnets 213 aligned diametrically thereacross and exposed at their remote ends through the side of the plunger and at their adjacent ends opening into the stem passage 206 and the stem, which may be of magnetic metal, extends between the magnets 213 and may thus be held in position against accidental outward movement in the passage 206.

Formed in the wall of the barrel 200 at diametrically opposite sides and in line with the magnets, are the two recesses 214 which open into the barrel passage 201 for the purpose about to be described.

The numeral 215 designates the disk portion of the knife, from the periphery of which disk extends the circular knife 216. This knife disk encircles the bore 201 and is secured to the adjacent end of the barrel and formed integral with the top of the disk are two spring arms 217, each of which lies in a recess 214 and is biased to move or be urged into the barrel bore 201. Thus when the plunger 205 is at the innermost position of its movement the remote ends of the bar magnets 213 will be contacted by the spring arms 217 and the plunger will thus be held by the magnetic attraction against movement.

In Figures 24 to 34 there are illustrated a number of barrel and plunger forms together with different embodiments of actuating stems, cutters and other features which may be employed.

Figure 24:
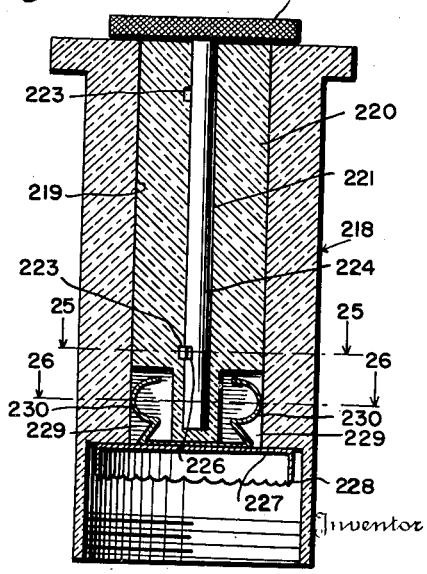
Figure 24 is a longitudinal section of a barrel and plunger illustrating other forms for such parts, together with a different embodiment of cutter.

In Figure 24 the illustrated barrel 218 is shown as having a bore 219 therethrough in which is positioned the straight plunger 220 which may be projected through either end of the barrel.

The plunger 220 has formed through the longitudinal center thereof the stem passage 221 which is closed at its inner end but opens at its outer end through the end of the plunger and one wall of this passage is provided with the channel 222 and at spaced intervals along the channel there are formed the short lateral slots 223 which communicate with the channel and with the passage.

Slidably positioned in the passage 221 is a stem 224 which carries a head 225 at its outer end and adjacent its inner end is a short lateral bar 226 which moves in the channel 222 when the stem is shifted inwardly or outwardly and is adapted for engagement, upon turning the stem, in one of the lateral slots 223 whereby to couple the stem with the plunger.

The inner end of the plunger 220 carries one of the several embodiments of the knife wherein there is provided a disk member 227 which positions against the inner end of the plunger and is secured thereto and secured around the edge of the disk 227 is the circular knife 228. As shown this disk at its periphery extends beyond the wall of the passage or bore in which the plunger lies and thus functions to limit the outward movement of the plunger.

The inner end of the plunger 220 is provided with the two diametrically oppositely positioned recesses 229 which open through the sides of the plunger and the knife disk 227 carries upon its top surface the two spring arms 230 which are biased to move outwardly. Thus when the plunger 220 is retracted into the barrel these spring arms will frictionally engage the wall of the bore and hold the plunger against accidental movement.

Instead of the spring arms 230 having frictional engagement with the bore to hold the plunger in position, use may be made of magnetic members as illustrated in the hereinafter described modifications of the knives and means of holding the same and the attached plunger in retracted position.

In Figure 28 the barrel 231 is provided with the plunger chamber 232 which opens through the outer end of the barrel as shown, while at its inner end it is reduced in size to the approximate cross sectional size and design of the plunger, by the shoulder 233 which encircles the inner end of the plunger 234.

The outer end of the plunger 234 carries a flange 235 which fits in and closes the outer end of the chamber 232.

Housed within the chamber 232 is a coil spring 232a which encircles the plunger and bears at its inner end upon the shoulder 233 while its outer end bears against the underside of the flange 235.

It will be obvious that any one of the several different forms of plunger actuating stems may be used with this plunger 234 but the stem here illustrated is designed to be adjusted with more accuracy than the types employing the lateral bars which engage in off-set slots, whereby a more accurate measurement of the ejected medicinal material can be obtained.

In the embodiment illustrated in Figure 28 the plunger has formed longitudinally therethrough, through the major portion of its length, the stem passage 23, which is threaded as indicated at 238 through the major portion of its length.

Extending into the passage 237 is the stem 239 which, at its inner end, has a slightly enlarged portion which is threaded as indicated at 240 for engagement with the threads 238, while the outer end of the stem carries the head 241. In this embodiment the stem between the head and the threaded portion is provided with suitable graduation markings 242 to facilitate the setting of the stem to a desired position for the ejection of medicine from the cartridge, such as the cartridge of the medicinal liquid 119 shown in Figure 13. It will be readily seen that by threading the stem inwardly or outwardly the graduation markings can be aligned with the top surface of the plunger and the inward movement of the plunger will be limited by the engagement of the circular head 241 with the top end of the barrel.

Figure 31 illustrates another type of barrel and plunger in association with which is illustrated an actuating stem of the same character illustrated in the preceding barrel and plunger arrangement although it is to be understood that any of the other types of stems may be employed.

In this figure the barrel is designated 248 and is shown as having a finger flange 249 around its top end. The top end also has the head 250 in which is formed the central opening 251 to receive the stem 239a.

The chamber 252 has in the lower portion of the barrel the encircling rib 253.

The numeral 254 designates the plunger which passes through the elliptical opening in the rib 253 and this plunger at its top end or outer end has the encircling flange 255.

Encircling the plunger 254 and bearing at one end against flange 255 and at the other end against the rib 253, is a coil spring 256 which constantly urges the plunger into retracted position against the underside of the centrally apertured head 250.

Since the graduated stem 239a is the same as that described in connection with the structure shown in Figure 28 and the plunger is threaded in the same manner to receive the lower end of this stem it is not believed that any detailed description of the structure is necessary in connection with the present figure.

Figure 32 illustrates another barrel and plunger arrangement wherein there is provided a vernier adjustment for more accurately regulating the stroke of the plunger and, consequently the amount of medicine ejected. In this figure the barrel is designated 260 and is shown as having a finger flange 261 about its outer end. The plunger chamber is designated 262 and, as in the other forms, the inner end of the chamber is defined by the inwardly projecting shoulder or flange 263.

At its outer end the barrel is interiorly threaded as shown at 264 and threaded into this end of the barrel is a vernier collar 265 which carries the annular head 266. As shown the head 266 is of an overall diameter greater than the threaded opening into which the collar extends and it extends outwardly beyond the collar so that the outer portion overlies the adjacent end of the barrel, while the inwardly projecting portion overlies the end of the plunger 267 which extends through the barrel and through the elliptical opening in the shoulder 263 at the inner end of the barrel, thus the inner portion of the head 266 limits the outward movement of the plunger.

The outward movement of the vernier collar 265 is limited by the laterally projecting stop fingers 268 which are carried upon the inner edge of the collar.

The outer end portion of the plunger 267 carries the encircling rib 269 which serves as a seat for the outer end of a spring 270 which encircles the plunger and bears at its inner end against the shoulder 263 thus constantly urging movement of the plunger outwardly in the barrel as will be readily apparent.

The plunger 267 has formed longitudinally therein, from its outer end, the operating stem passage 271 into which opens the longitudinal slot 272. The wall of the passage along one side of the slot is provided with the longitudinally extending series of short notches or recesses 273 similar to the recesses 223, for the purpose about to be stated.

Adapted to slide in the passage 271 is a stem 274 which has a head 275 upon its outer end and upon its inner end carries one or more short laterally directed lugs or fingers 276 which are adapted for selective engagement in the notches 273. The head 275 is designed to contact the head 266 of the vernier collar to limit the movement of the stem and plunger when the two are actuated for the ejection of medicine from the syringe.

The stem 274 which, of course, moves through the annular head 266, is provided with graduation markings as indicated at 278 which facilitates the setting of the stem for the ejection of a desired quantity of medicine. In the making of this setting it will be understood that the stem is set with the fingers 276 in the slot 272 and is then shifted lengthwise in the passage 271 until the desired graduation is brought into the plane of the head 266, whereupon the stem is turned to engage the fingers 276 in adjacent slots or notches 273. If upon setting the stem in the manner stated it is not possible to engage the fingers in the notches 273 it may be then necessary to move the stem in or out slightly to effect such engagement, and this will then change the setting of the scale with respect to the top of the vernier sleeve head. The vernier sleeve will then be turned to thread it inwardly or outwardly as may be desired so as to bring the surface of the head into the plane of the selected marking on the stem. It will then be seen that when the stem and plunger are forced inwardly until the head of the stem engages the head of the vernier sleeve, the correct indicated amount of medicine will be ejected from the syringe needle.

When the syringe is not in use the stem 274 will be fully inserted or extended in the passage 271 and in order to hold it in such position against accidental outward movement it can then be turned to engage the fingers 276 in the adjacent slots 273. As an alternative method of retaining the stem against movement the inner end of the plunger may be provided with two opposed magnets 279 positioned at opposite sides of the passage 271 so that the inner end of the stem will be located between the magnets and held thereby. Obviously, with this construction the stem would be of suitable metal, whereas with other embodiments of the invention where the use of magnets is not desired, the stem may be made of glass, plastic or any other suitable material.

In this form of barrel and plunger, as well as in the two preceding forms, use may be made of a circular cutter construction similar to that shown in Figure 1.

In Figures 35 to 41 there are shown a number of different cutter forms together with means for retaining in retracted position in the barrel, plungers of the types corresponding to those shown in Figures 20 and 24 and designated respectively 205 and 220.

In Figure 35 the barrel 280 is shown as having secured in opposite sides of the passage or chamber 281, the bar magnets 282 and the plunger 283 has formed at opposite sides thereof at its inner end, the recesses 284.

The knife structure comprises the disk or plate 285, carrying the circular blade 286 and this disk is secured in a suitable manner to the end of the plunger as illustrated.

Upon the top of the disk or plate 285 are the two spring arms 287, each of which is located in a recess 284 and when the plunger is fully retracted these arms are each adjacent to a magnet bar 282 and retracted thereby so as to hold the plunger in position.

In Figure 36 the same arrangement is employed with the exception that in this figure the plunger 283a carries on its inner end the axially directed threaded stud 288 and the plate or disk 285a of the knife structure is suitably apertured for the extension of the stud therethrough.

In Figure 37 the plunger 283b is recessed at its forward end as in the preceding forms, as indicated at 284a to receive the spring arms 287a which in this construction are not attracted by magnet bars but are biased to press outwardly and frictionally engage the wall of the passage in the barrel 280a and thus hold the plunger in position by friction instead of by magnetic attraction as in the two preceding forms.

In Figures 38, 39 and 40 a reversal of some of the features of the preceding figures is employed. For example, in Figure 38 the plunger 289, which has a flange 290 at its inner end for limiting its outward movement, is encircled by the cutter blade.

Here the blade carrying plate 291 is centrally apertured to permit the plunger 289 to move through it and the plate is secured to the forward end of the barrel 292 as illustrated.

Also in this construction the barrel, not the plunger, is provided with the opposite recesses as indicated at 293 and the cutter plate 291 carries the spring arms 294 which are biased to press inwardly against the wall of the plunger and frictionally engage and hold the latter in position.

In Figure 39 the construction illustrated and described in the preceding figure is the same with the addition to the inner end of the plunger 289a of the axially directed threaded stem 295.

In Figure 40 the construction corresponds to that illustrated and described in the two preceding figures with the exception that the threaded stud is not illustrated but the plunger 289b carries in its inner end the magnet bar 296 which extends transversely of the plunger and is in position to be contacted at its ends by the springs 294a of the cutter unit when the plunger is fully retracted so that the magnetic attraction will hold the plunger in position.

In all of the preceding figures the plunger barrel has been illustrated with a flange encircling the outer end for engagement by the fingers between which the barrel is held while the plunger is being forced inwardly by the thumb.

In Figures 42 to 48 there is illustrated a retractile finger grip assembly which may be used or which may form a part of any one of the preceding barrel structures in place of the finger flanges described.

In these figures the reference character B designates the outer end of a barrel which may be representative of any one of the preceding barrels, minus the finger flanges, as stated. This barrel B as well as those preceding types of barrels wherein an assembly of parts must be effected within the barrel chamber which prevents the introduction of such parts through the inner or outer end of the barrel, the barrel is made up of the major portion b and the smaller or minor portion c which comprises the outer end of the barrel and these two portions, after the plunger parts and finger grip assembly about to be described have been placed in position, are sealed together by fusing or welding.

The barrel part *b* is provided at opposite sides with the openings 297 and positioned within the barrel is a frame structure which is generally designated 298 which comprises the upper and lower rings 299 and 300 respectively which are maintained in spaced concentric relation by two spaced bars 301 on each side of the rings as shown. These bars position within the barrel openings 297.

The outer ends of each pair of bars are connected by a thickened cross bar 302 which is formed as an integral part of the outer or upper ring 299 and the outer ends of each pair of bars are provided with the aligned pivot pin openings 303 for the purpose about to be described.

Secured against the inner faces of each pair of bars 301 is a plate 304 which has cut therefrom, from the center of the top edge, the strip 305, the free end portion of which is angularly bent to form a yieldable means or spring tongue 306 which projects outwardly between the adjacent bars 301.

Between each pair of bars 301 is a finger grip bar 307 which has a head portion 308 through which extends a pivot pin 309 which has its ends engaged in the apertures 303.

On the inner side of the head 308 there is formed the nose 310 which lies above the spring tongue 306 so that when the finger grip arm 307 is swung outwardly to a position perpendicular to the axis of the barrel, this nose will press down on the spring tongue and as the outer end of the nose is flattened it will come into flat contact with the surface of the spring tongue and thus the finger grip arm will be maintained in the outwardly extended position.

In the illustration of this finger grip assembly the outer end portion *c* of the barrel has been illustrated as having a small central opening *d* for the extension therethrough of a plunger stem. No illustration has been made of a plunger, plunger stem or other parts, as it is to be understood that the finger grip assembly is not restricted to use with any one of the described specific other features but may be used with one or all thereof as may be found desirable.

I claim:

1. As a new combination, an elongate plunger barrel open at its ends, a plunger body slidable in the barrel and adapted to have one end extended through and beyond one open end of the barrel, a medicament cartridge having a cylindrical bore, the cartridge having an outlet at one end, means for coupling the other end of the cartridge with said one open end of the barrel, the plunger being adapted when projected from the barrel to enter the bore of the cartridge through said other end of the latter, a movable closure fitting in the bore of the cartridge at the said other end of the latter to be propelled through the bore by the plunger, a frangible seal overlying the said other end of the cartridge and said closure, and means carried by the plunger for rupturing said seal when the said one end thereof and the seal are forced together.

2. A combination plunger assembly and disposable medicament container comprising an elongate barrel having an open forward end, a plunger within the barrel, adjustable means for shifting the plunger in the barrel to project an end of the plunger a desired distance through and beyond said open forward end of the barrel, a cutter element carried by said end of the plunger, a cylindrical container open at one end and having an outlet opening centered in its other end, a closure member, constituting a piston, slidably fitted within the said open end of said container to be forcibly moved by said plunger inwardly of the container to effect ejection of the container contents outward through said outlet, means for coupling the said other end of the container with the said open forward end of the barrel, a sealing element covering the said other end of the container and the closure element adapted to be cut by the cutter element upon movement of said plunger, and means for yieldingly holding the plunger retracted within the barrel.

3. The invention according to claim 2, wherein said plunger has an open ended axial bore and the first means is constituted in an actuating stem positioned in said bore, means for coupling the stem and plunger together comprising a groove formed longitudinally in the wall of said bore, a plurality of spaced circular slots formed in said wall communicating with said groove, and a lug carried by the stem for sliding movement in the groove to a selected slot for engagement in such slot upon axial turning of the stem.

4. The invention according to claim 2, wherein the last named means comprises coacting magnetic elements carried by opposing surfaces of the barrel and plunger, said elements being brought into juxtaposition when the plunger is fully retracted.

5. The invention according to claim 2, wherein the last named means comprises coacting friction means between the plunger and barrel, said friction means becoming effective to hold the plunger against free movement when the plunger is in its fully retracted position.

6. As a new combination, a plunger assembly and disposable medicament container, said container having a straight internal bore, a plug fitting in the bore and closing the container at one end, the plug being designed to function as a piston, the container having an outlet at its other end, a frangible seal overlying the plug end of the container, said plug end of the container having external screw threads, said plunger assembly comprising a barrel having an open internally screw threaded forward end for threaded connection with the said plug end of the container, a plunger within the barrel and having a forward end of a diameter to enter the plug end of the container to effect movement of the plug inwardly, means for facilitating the forward movement of the plunger, and a circular knife positioned within the forward end of the barrel concentric with the forward end of said plunger for cutting said seal.

7. The invention according to claim 6, wherein said barrel has an internal annular shoulder through which the plunger moves, the plunger having a surrounding collar remote from the shoulder, and a coil spring encircling the plunger between the shoulder and collar and functioning to constantly urge the plunger into retracted position within the barrel.

8. The invention according to claim 6, wherein said circular knife is in the form of cylinder secured to the forward end of and concentric with the plunger, and has a forwardly directed sharpened cutting edge, and a retractable guard for the cutting edge of the knife and lying within the latter.

9. The invention according to claim 6, wherein said knife is secured to the forward end of the barrel and is annular for the extension of the plunger therethrough.

References Cited in the file of this patent

UNITED STATES PATENTS

| | | |
|---|---|---|
| 963,051 | Kooken | July 5, 1910 |
| 1,718,602 | Smith | June 25, 1929 |
| 2,129,675 | Cole | Sept. 13, 1938 |
| 2,317,558 | Smith | Apr. 27, 1943 |
| 2,561,273 | Hamilton | July 17, 1951 |

FOREIGN PATENTS

| | | |
|---|---|---|
| 27,095 | Great Britain | Nov. 22, 1909 |